(12) United States Patent
Chang et al.

(10) Patent No.: US 12,328,616 B2
(45) Date of Patent: *Jun. 10, 2025

(54) MINIMIZATION DRIVE TEST FOR WIRELESS DEVICES WITH MULTIPLE RADIO ACCESS TECHNOLOGIES (RATS)

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/638,336

(22) Filed: Apr. 17, 2024

(65) Prior Publication Data

US 2024/0267775 A1    Aug. 8, 2024

Related U.S. Application Data (63) Continuation of application No. 17/428,554, filed as application No. PCT/US2020/016732 on Feb. 5, 2020, now Pat. No. 11,979,765.

(60) Provisional application No. 62/805,769, filed on Feb. 14, 2019.

(51) Int. Cl.
*H04W 24/10* (2009.01)
*H04W 24/08* (2009.01)
*H04W 88/06* (2009.01)

(52) U.S. Cl.
CPC ......... *H04W 24/10* (2013.01); *H04W 24/08* (2013.01); *H04W 88/06* (2013.01)

(58) Field of Classification Search
CPC ...... H04W 24/10; H04W 24/08; H04W 88/06
See application file for complete search history.

(56) References Cited

U.S. PATENT DOCUMENTS

| | | | |
|---|---|---|---|
| 2013/0109423 A1 | 5/2013 | Iwamura et al. | |
| 2017/0134980 A1 | 5/2017 | Persson et al. | |
| 2018/0063737 A1* | 3/2018 | Yamine | H04W 24/10 |
| 2019/0306740 A1* | 10/2019 | Kim | H04W 24/10 |
| 2022/0085950 A1 | 3/2022 | Yang et al. | |

FOREIGN PATENT DOCUMENTS

| | | |
|---|---|---|
| KR | 10-2012-0133879 A | 12/2012 |
| WO | 2016012053 A1 | 1/2016 |

OTHER PUBLICATIONS

3GPP; "Technical Specification Group Services and System Aspects, Release 15 Description, Summary of Rel-15 Work Items (Release 15)", TR 21.915 V0.6.0; Feb. 4, 2019; Valbonne, FR.

* cited by examiner

*Primary Examiner* — Derrick V Rose (57) ABSTRACT

A mobile wireless communication user equipment device (mobile device) simultaneously stores logs for two minimization drive tests (MDTs) where a first MDT is associated with a first radio access technology (RAT) and a second MDT is associated with a second RAT. The mobile device logs MDT data for both MDTs to generate two MDT logs. In response to a request, the mobile device transmits a requested MDT log where the MDT log may be transmitted to a base station of a RAT different from the RAT of the MDT log.

6 Claims, 5 Drawing Sheets

MINIMIZATION DRIVE TEST FOR WIRELESS DEVICES WITH MULTIPLE RADIO ACCESS TECHNOLOGIES (RATS)

CLAIM OF PRIORITY

The present application is a continuation of and claims priority to U.S. application Ser. No. 17/428,554, entitled "MINIMIZATION DRIVE TEST FOR WIRELESS DEVICES WITH MULTIPLE RADIO ACCESS TECHNOLOGIES (RATS)" and filed on Aug. 4, 2021; which is a national stage application of PCT/US2020/016732, entitled "MINIMIZATION DRIVE TEST FOR WIRELESS DEVICES WITH MULTIPLE RADIO ACCESS TECHNOLOGIES (RATS)" and filed on Feb. 5, 2020; which claims priority to Provisional Application No. 62/805,769, entitled "Minimization of Drive Test for Multi-RAT Dual-Connectivity" and filed Feb. 14, 2019; all of which are assigned to the assignee hereof, and hereby expressly incorporated by reference in their entirety.

FIELD

This invention generally relates to wireless communications and more particularly to minimization drive tests (MDT) for wireless devices with multiple radio access technologies (RATs).

BACKGROUND

Wireless communication systems operating in accordance with various standards employ minimization drive tests (MDT) to improve wireless communication coverage. When new base stations are deployed, drive tests are performed before and after service activation of the new cell (base station). Initially, downlink/uplink (DL/UL) coverage measurements of the new cell and neighbor cells are made in the intended area of coverage improvement. During this phase, initial area tuning is performed (e.g. selection of an appropriate antenna for the new cell, adjustment of antenna tilting of the new cell and neighbor cells, etc.). Service with the new cell will be started after such initial tuning. Drive tests are performed to collect more extensive data of DL/UL coverage measurements in the intended area to confirm that adequate DL/UL coverage is being provided. In order to reduce the rigorous drive tests that are needed to collect downlink/uplink coverage measurements Minimization of Drive Test (MDT) are used to gather data. Using an MDT procedure, measurements can be collected from user equipments (UEs) (mobile devices) without the need for the extensive drive tests. As a result, the MDT can reduce network maintenance costs for operators, ensure a faster optimization cycle resulting in higher customer satisfaction and help to reduce the carbon emission to protect the environment. Furthermore, MDT enables operators to collect measurements from areas which are not accessible for drive tests (e.g. narrow roads, forests, private land/house/office). Other uses of MDT include mobility, capacity, QoS optimizations. In order to collect measurements from the mobile communication device, the device must be configured with the MDT parameters. The MDT configuration parameters typically include indicators of what parameters to measure, the time stamp of the log, how long the measurement should last and what parameters to report.

SUMMARY

A mobile wireless communication user equipment device (mobile device) simultaneously stores logs for two minimization drive tests (MDTs) where a first MDT is associated with a first radio access technology (RAT) and a second MDT is associated with a second RAT. The mobile device logs MDT data for both MDTs to generate two MDT logs. In response to a request, the UE mobile device transmits a requested data from an identified MDT log where the MDT log may be transmitted to a base station of a RAT different from the RAT of the MDT log.

DETAILED DESCRIPTION

As discussed above, conventional MDT techniques require the mobile wireless communication device to log and store values. As communication systems advance, mobile communication devices are being enabled to access more than one base station where each base station uses a different radio access technology (RAT). A RAT is the underlying physical connection method to access the radio network. Examples of RATs include Bluetooth, Wi-Fi, and GSM, UMTS, LTE and 5G NR. Some wireless communication devices and systems support simultaneous access of multiple base stations by the communication device. For example, 5G deployments such as New Radio (NR) base stations are expected to support Multi-RAT Dual Connectivity (MR-DC). MR-DC is deployed using both NR and LTE together with a Master Node (MN) and a Secondary Node (SN), whereby the MN uses NR and the SN uses LTE and vice versa. Under MR-DC operation, the network may need MDT configured for both LTE and NR simultaneously even though only one MDT can be supported in the conventional LTE MDT. In order to collect measurements from the UE device, the UE device must be configured with the MDT parameters including what parameters to log, how long the measurement should last, what parameters should be reported, and for which RAT the measurements apply to. Since the UE device is only allowed one RAT-specific MDT configuration at any given time in conventional systems, the network needs to select the RAT for which the UE device should perform MDT measurements. If a UE device needs to collect measurements from a second RAT base station (RAT base station 2) when it is currently configured to collect measurements from the first RAT base station (RAT base station 1), the network would have to configure the UE communication device with the MDT configuration belonging to RAT base station 2 and terminate the existing RAT base station 1 MDT configuration. In accordance with the examples discussed herein, however, the UE device is configured to perform MDT measurements on both RATs and log the results.

Figure 1:
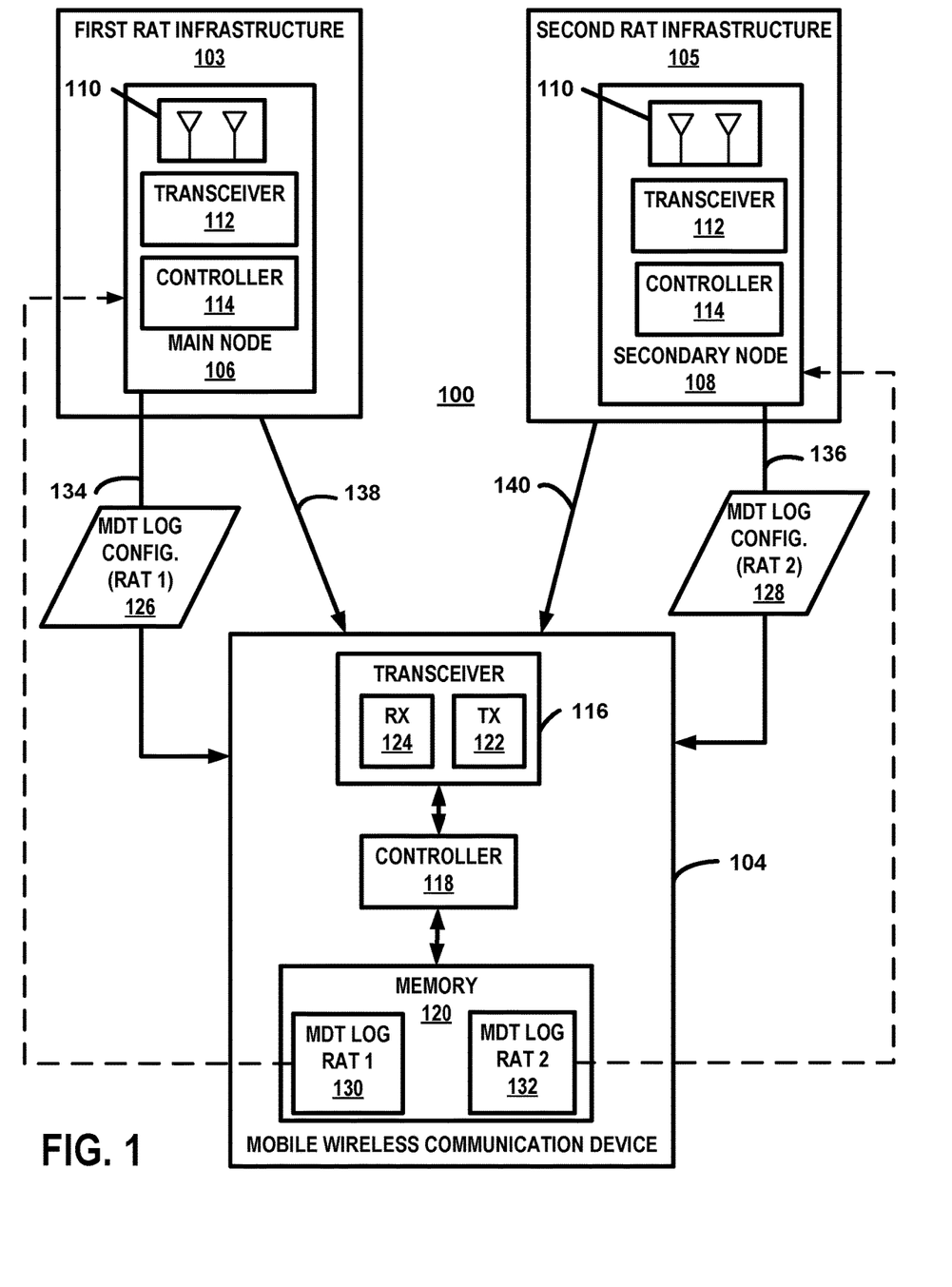
FIG. 1 is a block diagram of a communication system including communication infrastructure and mobile wireless communication devices.

FIG. 1 is a block diagram of a communication system 100 including communication infrastructure 102 and mobile wireless communication devices 104. The communication system infrastructure 102 includes a portion 103 operating in accordance with the first RAT and a portion 105 operating in accordance with a second RAT. Each portion 103, 105 includes at least one base station 106, 108 and, in most implementations, includes several base stations, controllers, and backhaul equipment (not shown). The base stations 106, 108 transmit and receive control and data signals to and from user equipment mobile wireless communication devices (UE devices) 104 and may be referred to as eNodeBs, eNBs, gNBs, transceiver stations, access points, and other terms depending on the particular type of system. For the example of FIG. 1, the first base station 106 is performing the functions of a master node (MN) for the UE device 104 and the second base station 108 is performing the functions of a secondary node (SN) for the UE device 104. Each base station 106, 108 includes at least an antenna system 110, a transceiver 112, and a controller 114. Although the antenna system 110 may only include a single antenna, the antenna system 110 may include multiple elements or antennas and is typically controllable such that the antenna radiation and reception patterns can be adjusted. The transceiver 112 includes electronics for transmitting downlink signals and receiving uplink signals through the antenna system 110. The controller 114 is any combination of electronics, processors, and/or processor arrangements that runs code to perform base station functions described herein as well as facilitate the overall operation of the base station. Since the two base stations 106, 108 operate in accordance with different RATs, the components of the base stations are typically different. For example, since the operation frequencies and protocols for the two RATs are different, the antennas, transceivers, controllers are different. For the examples discussed herein, at least one base station operates in accordance with 3rd Generation Partnership Project (3GPP) standards and protocols except for the distinctions discussed with reference to Minimization of Drive Test (MDT) operations. The other base station may operate in accordance with another RAT specification by 3GPP or by another specification. For example, one base station may operate in accordance with LTE and the other may operate in accordance with a 5G specification, such as New Radio (NR). 5G typically will have superior latency and reliability over 4G LTE. 5G will also support much higher data rate than 4G since more carriers can be aggregated e.g., 4G LTE can aggregate up to 5 component carriers for a total of 100 MHz bandwidth (20 MHz per component carrier) while 5G can aggregate up to 32 component carriers for a maximum bandwidth of 640 MHz. However, such wide bandwidth for 5G is typically available at much higher carrier frequency e.g., 28 GHz, while 4G LTE is typically operated below 3.5 GHz. As a consequence, 5G will typically have a much smaller coverage than the 4G LTE due to the larger propagation loss at higher operating frequency. In this respect, while operating in MR-DC, the SN is typically the 5G base station while the MN is the 4G LTE. The SN will provide the higher throughput (hot spot) while the MN will provide more robustness in terms of mobility (less handover failures), but at less throughput.

The MDT procedure is discussed with reference to a single mobile wireless communication device (mobile device) 104 for the examples herein although multiple devices may perform the MDT procedure for a particular coverage region. The mobile wireless communication devices (mobile devices) 104 include devices such as wireless telephone devices, sometimes referred to as handsets or cell phones, as well as other devices such as wireless personal digital assistants (PDAs) laptop computers, tablets and wireless modems. The mobile devices are sometimes referred to as user equipment (UE) and UE devices.

Each mobile wireless communication device (mobile device) 104 includes at least a transceiver 116, a controller 118, and memory 120. A transmitter 122 and receiver 124 of the transceiver 116 include electronics for transmitting and receiving signals, respectively. The transmitter 122 and receiver 124 may include any combination of hardware, software, and/or firmware. In most circumstances, the mobile wireless communication devices 104 also include input and output devices such as, for example, visual displays, keyboards, touch screens, microphones and speakers (not shown). The transceiver 116 is capable of operating in accordance with at least two RATs and, therefore, is capable of transmitting and receiving signals using the frequencies and protocols of both RATs. In some situations, the transceiver 116 includes two transceivers where each transceiver supports communication with a different RAT. The two transceivers may share some components. For example, components such as antennas and amplifiers may support communication with both RATs and can, therefore, be used by both transceivers.

As discussed above, the MDT procedure provides a means for collecting data that can be used to optimize system performance. As is known, antennas 110 and other equipment at one or more base stations 106, 108 are adjusted based on the data provided by mobile wireless communication devices 104 and acquired during the MDT procedure. The information regarding the quality of received signals provided by the mobile wireless communication devices 104 is used to improve communication coverage in the desired areas. Adjustments may be made to multiple base stations 106, 108 to reduce interference and increase signal power within the desired regions. For example, the antenna of a serving base station providing the communication service in accordance with a first RAT may be adjusted to increase signal strength in a service area of the base station and the antenna of a nearby interfering base station (not shown) using the same RAT may be adjusted to reduce signal from the interfering base station in the service area of the serving base station.

For the examples herein, each base station 106, 108 sends a MDT log configuration message 126, 128 associated with the RAT of the base station 106, 108. The mobile device 104 performs that MDT procedures for both RATs in accordance with the two sets of MDT configuration parameters in the two MDT log configuration messages 126, 128 and maintains the MDT log 130, 132 for each RAT. The first base station (main node) 106 in the first RAT infrastructure 103 sends an MDT log configuration message 126 to the mobile wireless communication device 104 where the MDT log configuration message 126 provides information indicative of the MDT procedure that should be performed by the mobile device 104 for the first RAT. The second base station (secondary node) 108 in the second RAT infrastructure 105 sends a MDT log configuration message 128 to the mobile wireless communication device 104 where the MDT log configuration message 128 provides information indicative of the MDT procedure that should be performed by the mobile device 104 for the second RAT. The configuration messages can be transmitted using control signals 134, 136. The mobile device 104 performs the MDT procedure for the first RAT and maintains a first RAT MDT log 130. The mobile device 104 also performs the MDT procedure for the second RAT and maintains a second RAT MDT log 132 simultaneously with the first RAT MDT log 130.

The mobile device 104 provides the MDT logs 130, 132 to each RAT infrastructure 103, 105. In some situations, the MDT log for one RAT may be retrieved by a base station in another RAT infrastructure and then forwarded to the RAT infrastructure to which the MDT log corresponds. As discussed below with reference to FIG. 2A, in another situation, one base station operating in accordance with a first RAT indicates to the mobile device that the base station operating in accordance with a second RAT is requesting retrieval of the second MDT log. The mobile device 104 sends the MDT log for the second RAT directly to the second base station.

After receiving the MDT configuration parameters, the mobile wireless communication device 104 executes the MDT procedures. Signals 138, 140 that are measured by the mobile wireless communication device 104 are referred to herein as measurement signals 138, 140. Although other signals may be used in some situations, the measurements signals 138, 140 are typically reference signals such as pilot signals. The controller 118 evaluates measurement signals 138, 140 received by the receiver 124 to measure a signal characteristic. The signal characteristic may be any parameter, value, or characteristic that indicates, or that can be used to calculate, the signal quality of the measurement signal 130. In accordance with conventional MDT procedures, the signal characteristic is a signal strength or power related value such as Reference Signal Received Power (RSRP) or Reference Signal Received Quality (RSRQ).

Figure 2A:
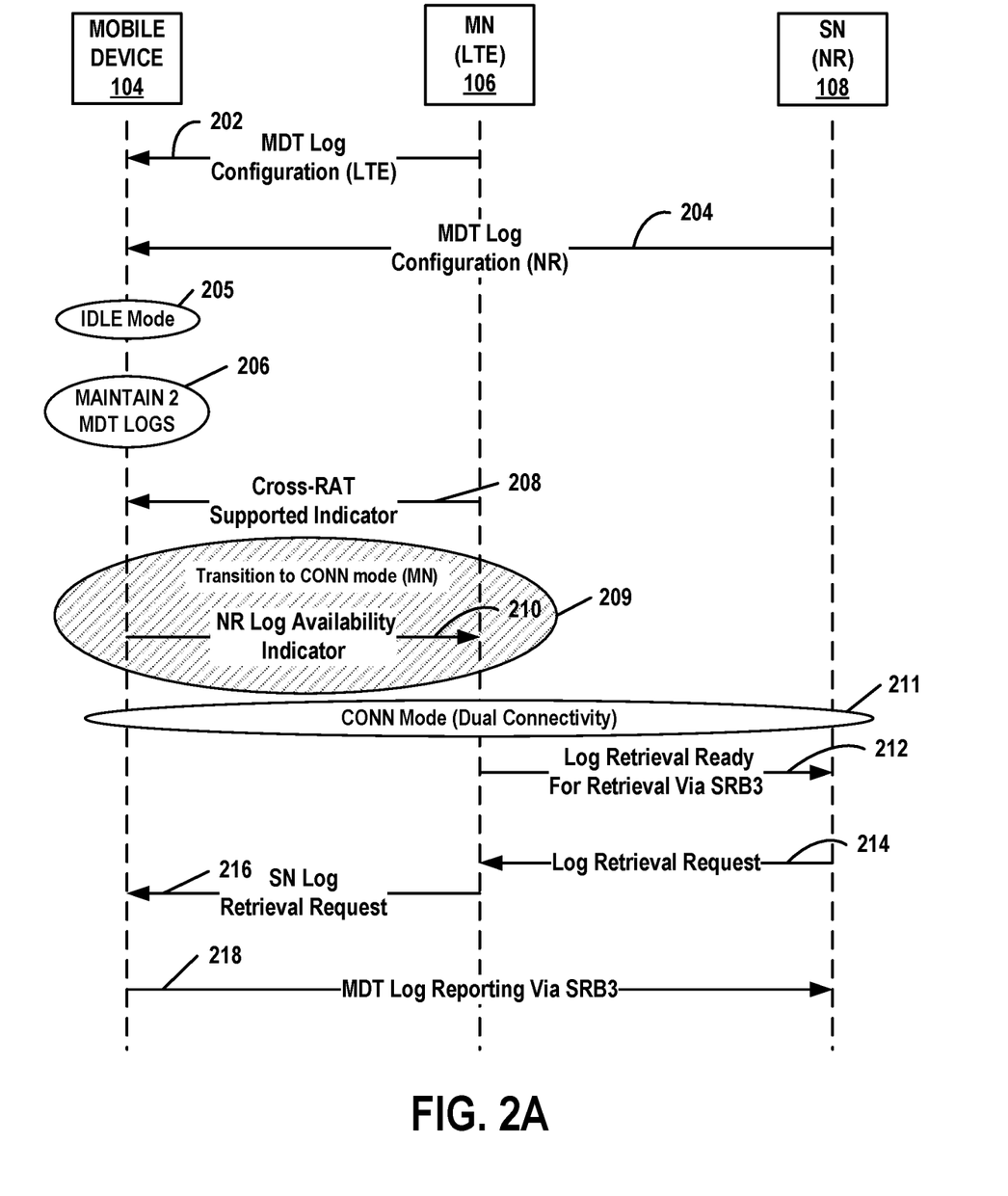
FIG. 2A is a messaging diagram of an example where the main node (MN) 106 operates in accordance with an LTE RAT, the secondary node (SN) operates in accordance with a New Radio (NR) RAT and the mobile device maintains an MDT log for each RAT.

FIG. 2A is a messaging diagram of an example where the main node (MN) 106 operates in accordance with an LTE RAT, the secondary node (SN) 108 operates in accordance with a New Radio (NR) RAT and the mobile device 104 maintains an MDT log for each RAT. Accordingly, for the example of FIG. 2A, the MN 106 operates in accordance with an LTE communication specification and the SN 108 operates in accordance with a NR communication specification. The example of FIG. 2A may be useful in situations when the mobile device in an inactive state on the NR RAT.

At transmission 202, the MN 106 sends an MDT log configuration message 126 that provides information regarding the MDT procedure for the LTE RAT that should be performed by the mobile device 104. The configuration is in accordance with conventional MDT logging techniques. The MDT log configuration message is sent to the mobile device 104 in Connected mode while the logging operation does not start until the mobile device 104 transitions to either IDLE mode or INACTIVE state. The MDT log configuration includes downlink pilot strength measurements for the LTE serving cell. Also, the measurements for the serving cell must be for LTE while the neighbor cell measurements can be for either NR or LTE. Typically, only periodic measurement is supported in LTE. The log configuration is also stored in the mobile device 104 until the logging duration expires.

At transmission 204, the SN 108 sends an MDT log configuration message 128 that provides information regarding the MDT procedure for the NR RAT that should be performed by the mobile device 104. Other than the RAT type, the contents of the NR MDT log configuration message are similar to that of the LTE MDT log configuration message. In some cases, the measurements may be configured to be periodical or event-based. Neighbor cells measurements can also be configured in some circumstances. The neighbor cells (i.e., non-serving cells), however, may be both NR and LTE cells.

At event 205, the mobile device enters the IDLE mode. For the examples, the MDT logging procedures are performed when in the IDLE mode and the mobile device is not ACTIVE or CONNECTED on either RAT.

At event 206, the mobile device performs the two MDT procedures for the RATs and maintains an MDT log for each RAT. Accordingly, the mobile device receives and measures characteristics of measurement signals transmitted from both RAT infrastructures to generate the first MDT log and the second MDT log where both the first MDT log and the second MDT log are stored in memory.

At transmission 208, the MN 106 sends a cross-RAT supported indicator indicating that the MN supports NR log reporting. The cross-RAT supported indicator notifies the mobile device 104 that the mobile device can notify the MN when an MDT log for the RAT infrastructure of the secondary node is ready. For the example of FIG. 2A, therefore, the mobile device is notified that it can send an LTE log availability indicator to the MN 106 when a NR MDT log is available. Specifically, the cross-RAT indicator indicates that first RAT infrastructure supports management of the second RAT MDT logs. Therefore, in some circumstances the indication indicates that the mobile device can provide notifications of second RAT MDT logs to base stations in the first RAT infrastructure. Although other techniques may be used, the MN 106 sends the cross-RAT supported indicator over a System Information Block (SIB). For example, dedicated signaling may be used to send the cross-RAT indicator to the mobile device when the mobile device is in the CONNECTED or ACTIVE state with the MN 106. In some situations, the other node (e.g., SN 108) may also support cross-RAT notification. Therefore, the SN may indicate to the mobile device that it can accept log indicators for a RAT belonging to the MN. Accordingly, the cross-RAT indicator may also indicate that the SN 108 supports cross-RAT notification for the first RAT. Alternatively, the SN 108 may send another cross-RAT supported indicator to the mobile device directly (not shown in FIG. 2A). As mentioned above, the cross-RAT indicator may be sent to the mobile device via dedicated signaling or broadcast using System Information Block (SIB). If it is sent via dedicated signaling, it should be sent before the mobile device transitions to IDLE or INACTIVE or after it has returned to ACTIVE or CONNECTED. In some cases, the decision to support cross-RAT indicators comes after the mobile device has already transitioned to IDLE or INACTIVE. In these cases, the MN broadcasts the cross-RAT indicator via SIB for the examples. Since the mobile device monitors and receives SIB in the IDLE and ACTIVE states, the cross-RAT supported indicator may be sent vis SIB while the mobile device in in the ACTIVE state.

At event 209, the mobile device transitions to the ACTIVE state with the MN 106. In accordance with conventional procedures the mobile device transitions from IDLE to CONNECTED.

At transmission 210, the mobile device 104 sends the MN 106 a NR MDT log availability indicator indicating that a NR MDT log is available. The NR MDT log availability indicator includes an indication of the RAT type (NR). For the example, the NR MDT log availability indicator is routed via the MN using SRB1 or SRB2. For the examples, the log availability indicator is sent to the MN 106 upon transitioning to ACTIVE/CONNECTED mode as part of the connection (re-)establishment procedure or resume procedure.

At event 211, the mobile device transitions to the CONNECTED mode with the SN 108. Therefore, the mobile device transitions to dual mode connectivity.

At transmission 212, the MN 106 sends the SN 108 a NR MDT log retrieval ready indicator indicating that a NR MDT log is available for retrieval and can be provided using inter-node messaging using the X2-C interface. The NR MDT log retrieval ready indicator includes an indication of the RAT type (NR).

At transmission 214, the SN 108 sends to the mobile device 104 an NR log retrieval request. For the example, the log retrieval request from the SN 108 is routed via the MN 106 using inter-node messaging over the X2-C interface.

At transmission 216, the MN 106 sends to the mobile device 104 a SN log retrieval request. In the example, the SN log retrieval request uses the UEInformationRequest message, an RRC message. The log retrieval requests 216 are routed using SRB1 or SRB2 in the example.

At transmission 218, the mobile device 104 sends the LTE MDT log to the SN 108 via SRB3. The MDT log report is included in the UEInformationResponse message in the example. SRB3 is the signaling radio bearer that is established between the SN and the mobile device to enable RRC PDUs to be sent directly between the SN and the mobile device. RRC PDUs for the SN can only be transported directly to the Mobile device for SN RRC reconfiguration not requiring any coordination with the MN. Also measurement reporting for mobility within the SN can be done directly from the UE to the SN if SRB3 is configured.

Figure 2B:
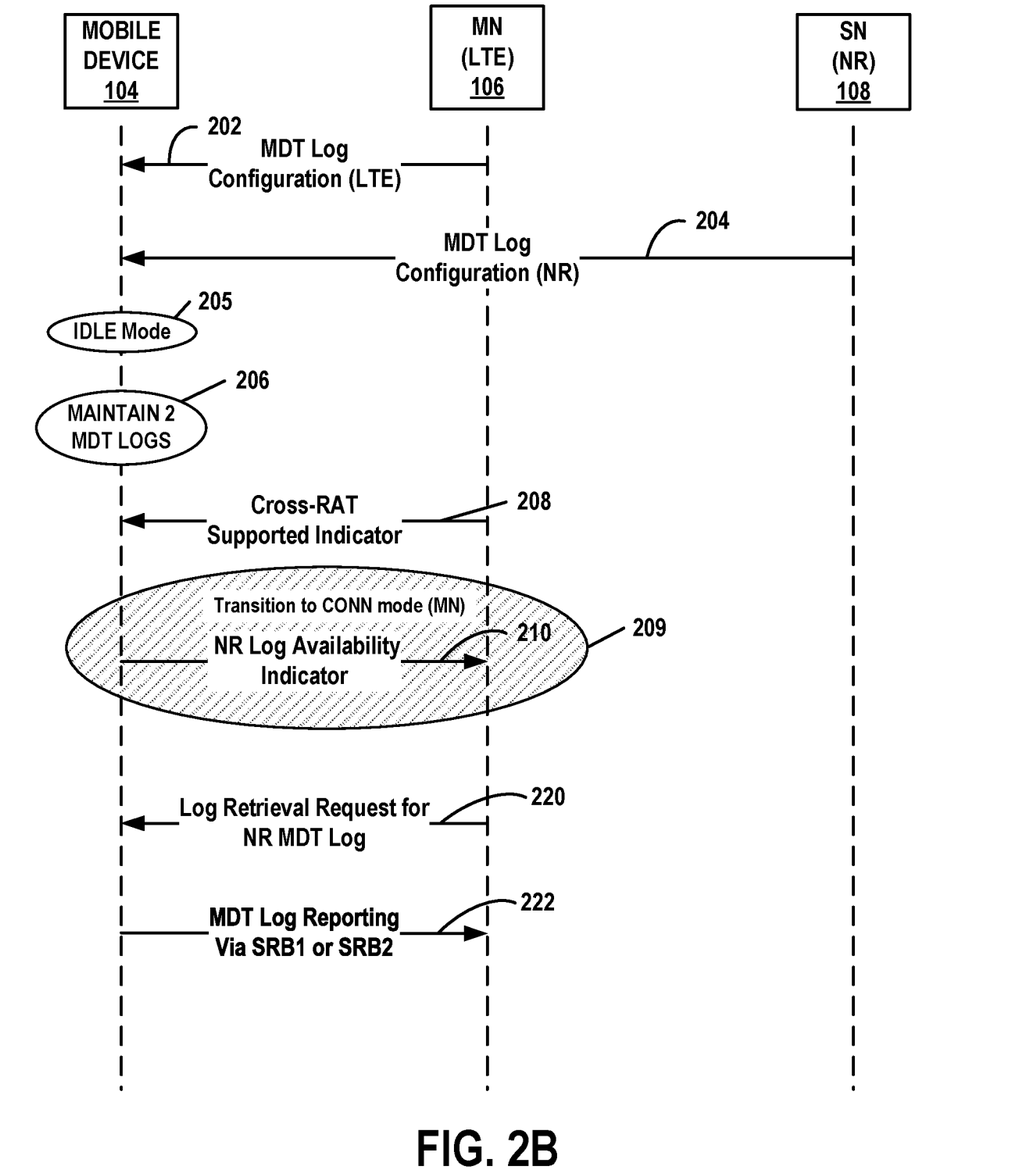
FIG. 2B is a messaging diagram of an example where the main node (MN) operates in accordance with an LTE RAT, the secondary node (SN) operates in accordance with a New Radio (NR) RAT, the mobile device maintains an MDT log for each RAT and the mobile device reports the NR RAT MDT log the MN.

FIG. 2B is a messaging diagram of an example where the main node (MN) 106 operates in accordance with an LTE RAT, the secondary node (SN) 108 operates in accordance with a New Radio (NR) RAT, the mobile device 104 maintains an MDT log for each RAT and the mobile device 104 reports the NR RAT MDT log the MN 106. The message flow and events of the example of FIG. 2B are similar to FIG. 2A except for the messages and operations related to reporting the MDT log of the second RAT (NR RAT). Accordingly, the example of FIG. 2B differs from the example of 2A beginning after the transmission of the NR MDT Log Availability Indicator 210. For the example of FIG. 2B, the mobile device may or may not be configured with dual connectivity. Accordingly, event 211 is excluded from example of FIG. 2B. After the NR MDT Log Availability Indicator transmission 210 to the MN 106, the MN 106 determines whether the NR MDT log should be retrieved. Typically, the retrieval of MDT logs is managed by the core network (not shown).

At transmission 220, the MN 106 send a Log Retrieval Request for the NR MDT log. For the example, the transmission 220 is sent via SRB1 or SRB2.

At transmission 222, the mobile device 104 reports the NR MDT log to the MN 106. For the example, the MN 106 received the log report over SRB1 or SRB2 and forwards the information to the core network.

Figure 3:
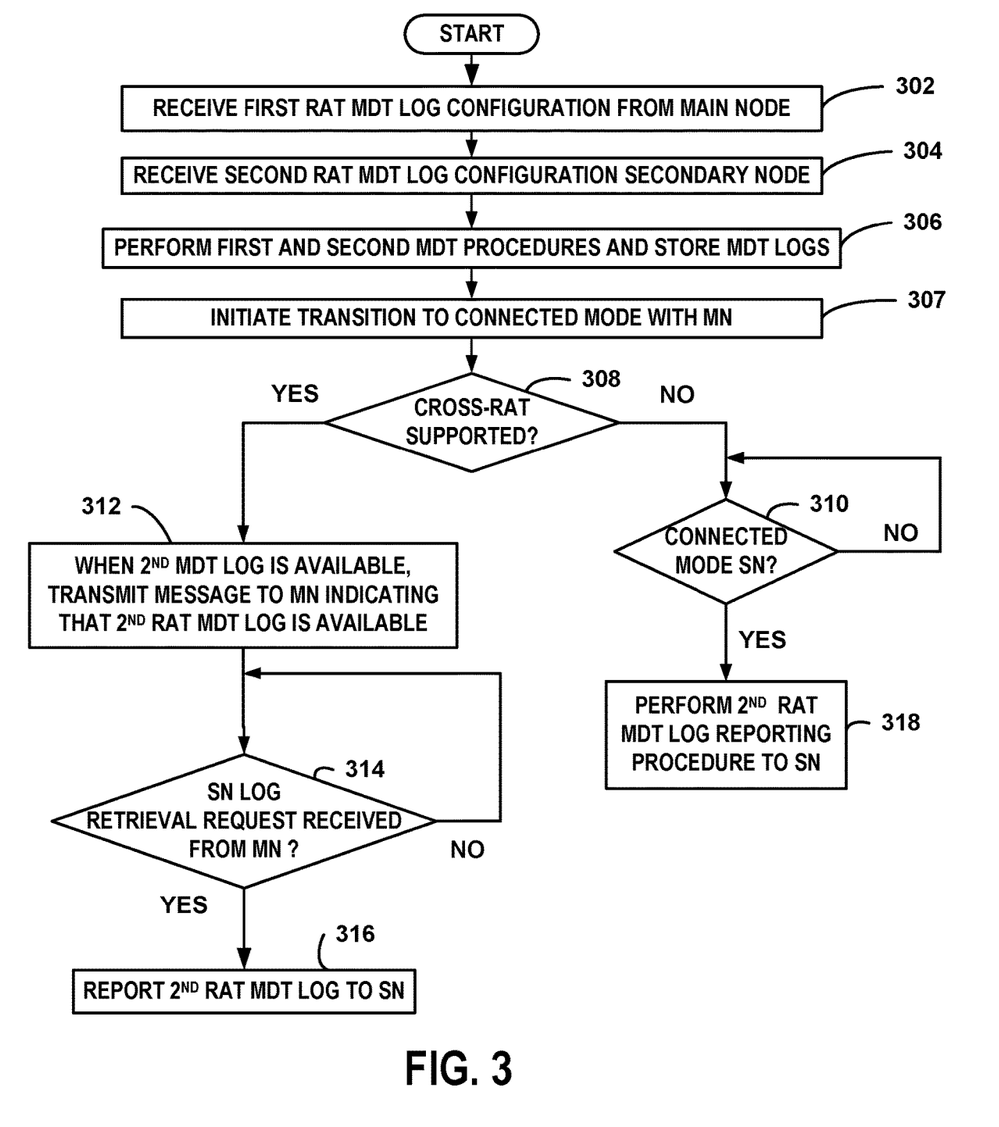
FIG. 3 is a flow chart of an example of a method of managing multiple RAT MDT procedures

FIG. 3 is a flow chart of an example of a method of managing multiple RAT MDT procedures. The example of FIG. 3 is typically performed by a mobile device or UE device. Therefore, the mobile device 104 discussed above in an example of a suitable device for performing the method of FIG. 3. For the example, the MN 106 is in a first RAT infrastructure and the SN 108 is within the second RAT infrastructure.

At step 302, a first RAT MDT log configuration message is received from the main node (MN) 106. The first RAT MDT log configuration message provides information on how the mobile device 104 should perform the MDT procedure for the first RAT infrastructure.

At step 304, a second RAT MDT log configuration message is received from the main node (MN) 106. The second RAT MDT log configuration message provides information on how the mobile device 104 should perform the MDT procedure for the second RAT infrastructure.

At step 306, the MDT procedure for the first RAT infrastructure and the MDT procedure for the second RAT infrastructure are performed. The MDT configurations for the first RAT infrastructure and the MDT configuration for the second RAT infrastructure are both stored in the mobile device. Once the mobile device transitions to IDLE or INACTIVE, it will only be served by one base station since there is no dual-connectivity operation (MR-DC or EN-DC) while the UE is in IDLE or INACTIVE. However, the mobile device may undergo reselection from cell to cell due to mobility and the target cell may belong to a RAT that is different from the source cell. Before the reselection, the mobile device performs MDT logging based on the MDT configuration belonging to the RAT of the serving cell. After reselection, the mobile device will perform the logging operation based on the RAT with the MDT configuration for the target cell. In this way, the two logs may be performed while the mobile device reselects from one RAT to another without transitioning to CONNECTED. The mobile device receives and measures measurement signals, such as reference signals, transmitted from the first RAT infrastructure and logs the values in memory to maintain a first MDT log. The mobile device also receives and measures measurement signals, such as reference signals, transmitted from the second RAT infrastructure and logs the values in memory to maintain a second MDT log when it reselects to a cell belonging to the second RAT. Therefore, the mobile device 104 measures characteristics of signals from both RATs and maintains both MDT logs in memory.

At step 307, the mobile device begins the transition to the CONNECTED mode with the MN 106. As discussed above, the mobile device performs the MDT log procedures while in IDLE and notifies the MN 106 of completed MDT logs during the transition to the CONNECTED mode. Accordingly, the mobile device begins transitioning to CONNECTED at least before step 312.

At step 308, it is determined whether cross-RAT log reporting is supported by the network and infrastructure currently accessible by the mobile device. For the example, the mobile device determines whether an indicator from the MN 106 has been received that indicates that the MN 106 and SN 108 support cross-RAT log reporting. Although other techniques may be used, the mobile device 104 receives the cross-RAT supported indicator over a System Information Block (SIB). If the cross-RAT log reporting is not supported, the method continues at step 310. Otherwise, the method continues at step 312.

At step 312, a message is transmitted to the MN 106 indicating that the second RAT MDT log is available. When the log is available, the mobile device generates a second RAT MDT log availability indicator. Where the second RAT operates in accordance with LTE, therefore, the mobile device indicates to the MN 106 that the LTE MDT log is available.

At step 314, it is determined whether a log retrieval request for the second RAT MDT log has been received. The mobile device determines whether a SN log retrieval request has been received from the MN 106. If the request has not been received, the method continues to monitor signals from the MN 106.

If the SN log retrieval request has been received, the method continues at step 316 where the MDT log for the second RAT is transmitted to the SN. The mobile device reports the second RAT MDT log to the SN vis SRB3 for the example. If SRB3 is not configured to the mobile device, however, the mobile device sends the second RAT MDT log to the MN 106 via SRB1 or SRB2. In one example, the MN 106 forwards the second RAT MDT log to the SN 108 via inter-node messaging over the X2-C interface. In another example, the MN 106 forwards the second RAT MDT log to the core network.

If at step 308, it is determined that cross-RAT MDT is not supported, the method continues at step 310. When cross-RAT reporting is not supported then the mobile device can only send a log availability indicator to a base station that operates on the same RAT as the MDT log. At step 310, the mobile device determines whether a transition to CONNECTED mode with the SN 108 has been initiated. When the transition has been initiated, the mobile device performs the second RAT MDT log reporting procedure to the SN 108 at step 318.

Figure 4:
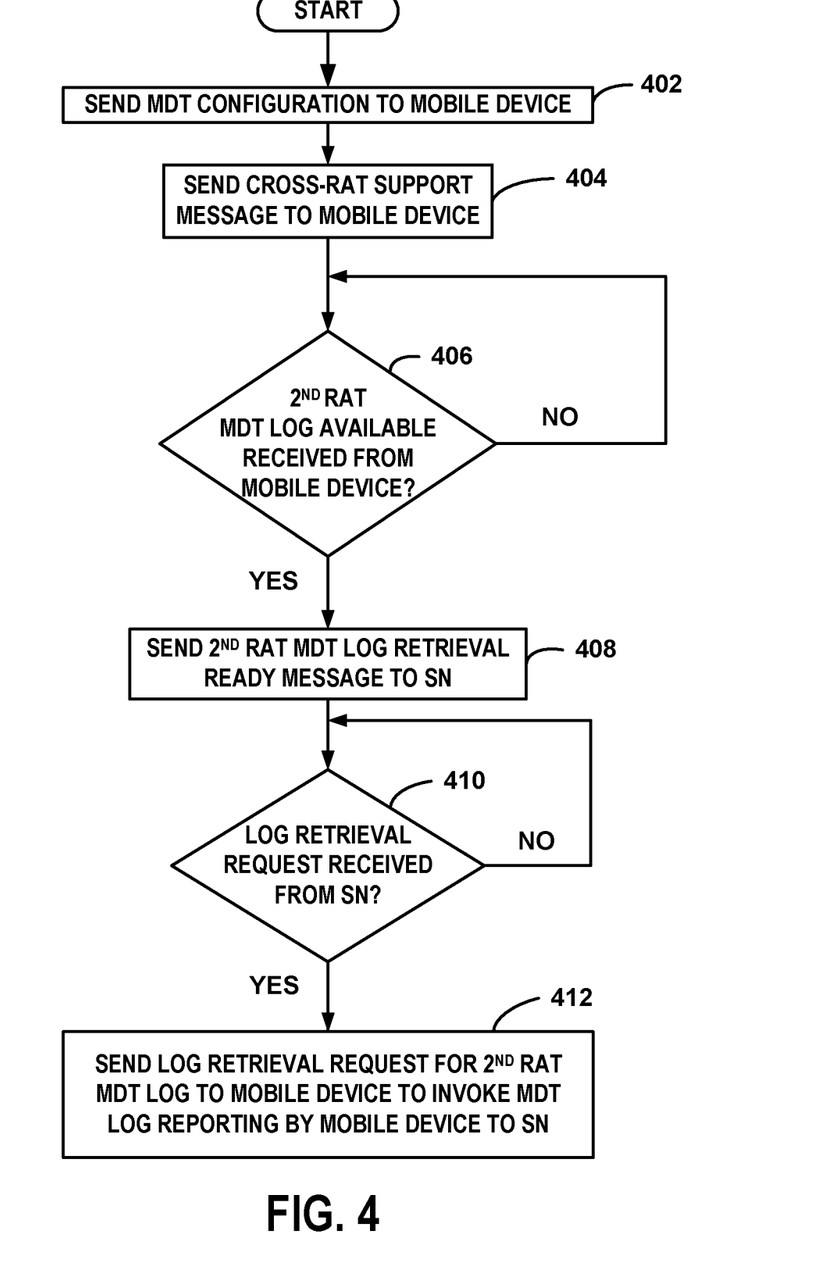
FIG. 4 is a flow chart of an example of a method of managing multiple MDT logs performed at a bae station operating as a Main Node (MN) for a mobile device.

FIG. 4 is a flow chart of an example of a method of managing multiple MDT logs performed at a bae station operating as a Main Node (MN) for a mobile device 104. The example of FIG. 4 is typically performed by a base station such the MN 106 discussed above. For the example, the MN 106 is in a first RAT infrastructure and the SN 108 is within the second RAT infrastructure.

At step 402, an MDT configuration message is sent to the mobile device 104. The MDT configuration message is a first RAT configuration message providing information regarding the first MDT logging procedure. Where the MN 106 is operating in accordance with 5G NR techniques, the MN 106 transmits a NR MDT configuration message.

At step 404, a cross-RAT support message is transmitted to the mobile device indicating that cross-RAT MDT log reporting is supported. The cross-RAT support message indicates to the mobile device 104 that the mobile device 104 can notify the MN 106 when a second RAT MDT log report is available for the SN 108.

At step 406, it is determined whether a second RAT MDT log availability message has been received from the mobile device 104. If no second RAT MDT log availability message has been received, the method returns to step 406 and the MN 106 continues to monitor signals from the mobile device 104. If a second RAT MDT log availability message has been received, the method continues at step 408.

At step 408, a second RAT MDT log retrieval ready message is sent to the SN 108. The MN 106 notifies the SN 108 that the second RAT MDT log at the mobile device is ready for retrieval. For the examples herein, the second RAT MDT log retrieval ready message is sent to the SN from the MN via inter-node messaging over the X2-C interface.

At step 410, it is determined where a log retrieval request from the SN 108 has been received from the SN 108. The MN 106 determines whether the SN 108 has requested the second RAT MDT log. If no log retrieval request has been received from the SN 108, the method returns to step 410 where the MN 106 monitors messages from the SN 108.

If a log retrieval request has been received from the SN 108, the method continues to step 412 where the MN 106 sends a log retrieval request for the second RAT MDT log to the mobile device 104. The log retrieval request invokes the transmission of the second RAT MDT log to the SN 108.

For the examples herein, the second RAT MDT log is reported by the mobile device 104 to the SN 108 via SRB3.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A mobile wireless communication device comprising:
a memory;
a receiver configured to receive a first plurality of reference signals from a first radio access technology (RAT) infrastructure and a second plurality of reference signals from a second RAT infrastructure;
a controller configured to:
execute a first RAT measurement procedure comprising measuring at least one signal characteristic of the first plurality of reference signals in accordance with a first measurement configuration to generate a first measurement log, the first plurality of reference signals transmitted from a first RAT infrastructure,
execute a second RAT measurement procedure comprising measuring at least one signal characteristic of the second plurality of reference signals in accordance with a second measurement configuration to generate a second measurement log, the second plurality of reference signals transmitted from a second RAT infrastructure, and
store, in the memory, the first measurement log and the second measurement log,
the receiver further configured to receive an indicator indicating that a measurement log availability indicator can be sent to the first RAT infrastructure, the measurement log availability indicator indicating that the second measurement log is available; and
a transmitter configured to transmit, to the first RAT infrastructure, the measurement log availability indicator.

2. The mobile wireless communication device according to claim 1, wherein
the receiver is configured to receive the indicator over a System Information Block (SIB).

3. A method comprising:
receiving a first plurality of reference signals from a first radio access technology (RAT) infrastructure and a second plurality of reference signals from a second RAT infrastructure;
executing a first RAT measurement procedure comprising measuring at least one signal characteristic of the first plurality of reference signals in accordance with a first measurement configuration to generate a first measurement log, the first plurality of reference signals transmitted from a first RAT infrastructure;
executing a second RAT measurement procedure comprising measuring at least one signal characteristic of the second plurality of reference signals in accordance with a second measurement configuration to generate a second measurement log, the second plurality of reference signals transmitted from a second RAT infrastructure;

storing the first measurement log and the second measurement log, receiving an indicator indicating that a measurement log availability indicator can be sent to the first RAT infrastructure, the measurement log availability indicator indicating that the second measurement log is available; and transmitting, to the first RAT infrastructure, the measurement log availability indicator.

4. The method of claim 3, wherein the receiving the indicator comprises receiving the indicator over a System Information Block (SIB).

5. A chipset for controlling a mobile wireless communication device, the chipset comprising a processor and a memory, the processor configured to execute processes of:

receiving a first plurality of reference signals from a first radio access technology (RAT) infrastructure and a second plurality of reference signals from a second RAT infrastructure;

executing a first RAT measurement procedure comprising measuring at least one signal characteristic of the first plurality of reference signals in accordance with a first measurement configuration to generate a first measurement log, the first plurality of reference signals transmitted from a first RAT infrastructure;

executing a second RAT measurement procedure comprising measuring at least one signal characteristic of the second plurality of reference signals in accordance with a second measurement configuration to generate a second measurement log, the second plurality of reference signals transmitted from a second RAT infrastructure;

storing the first measurement log and the second measurement log, receiving an indicator indicating that a measurement log availability indicator can be sent to the first RAT infrastructure, the measurement log availability indicator indicating that the second measurement log is available; and transmitting, to the first RAT infrastructure, the measurement log availability indicator.

6. The chipset of claim 5, wherein the receiving the indicator comprises receiving the indicator over a System Information Block (SIB).

\* \* \* \* \*